Figure 1:
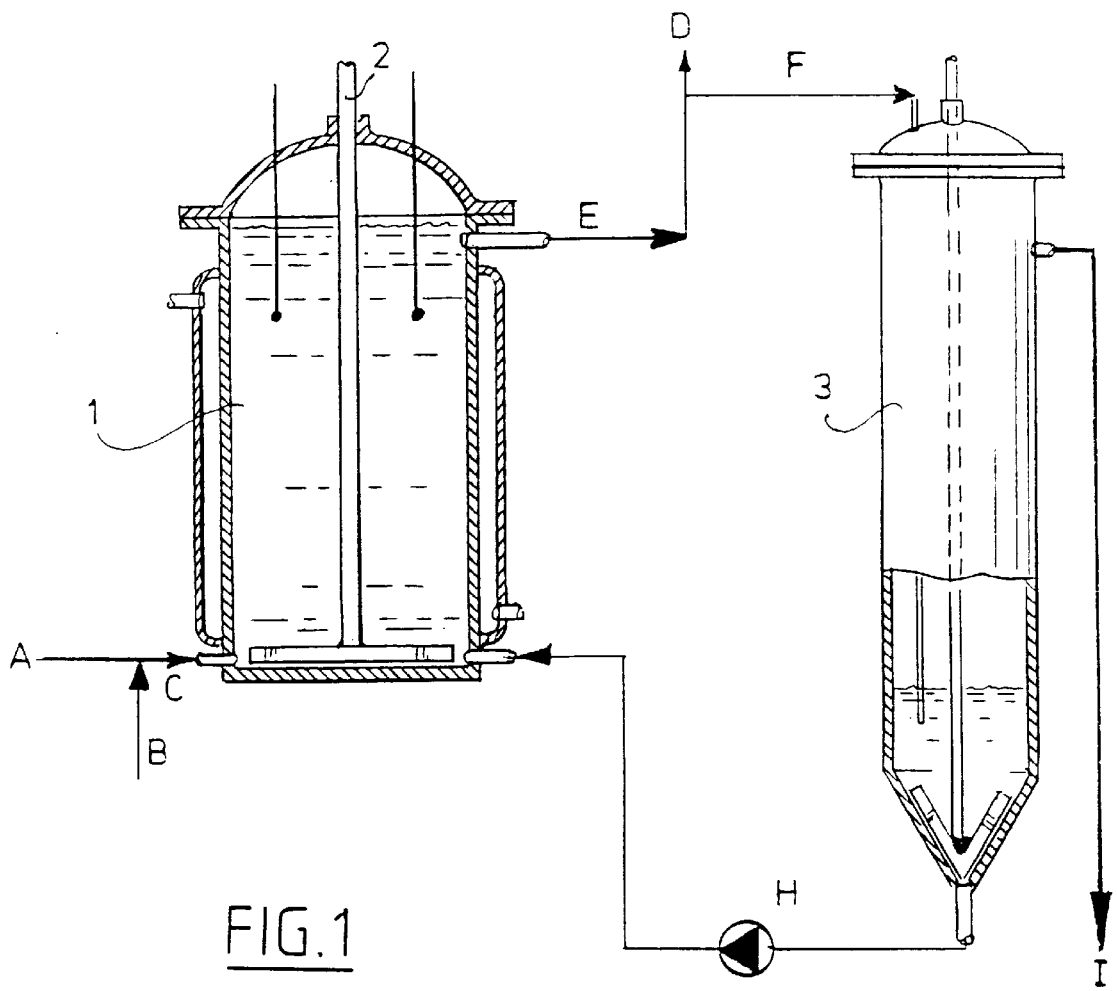

United States Patent
Vredenbregt et al.

[19]

[11] Patent Number: 5,830,357
[45] Date of Patent: Nov. 3, 1998

[54] PROCESS FOR CLEANING A WASTE WATER STREAM OR THE LIKE

[75] Inventors: Leonardus Hendrikus Joseph Vredenbregt; Andrea Agatha Potma, both of Arnhem; Gerrit Derk Enoch, Borne, all of Netherlands

[73] Assignee: N.V. Kema, Arnhem, Netherlands

[21] Appl. No.: 720,969

[22] Filed: Oct. 15, 1996

[30] Foreign Application Priority Data

Oct. 18, 1995 [EP] European Pat. Off. .............. 95202825

[51] Int. Cl.⁶ ................................ C02F 3/34; C02F 1/58
[52] U.S. Cl. .................... 210/611; 210/612; 210/631; 210/903
[58] Field of Search .......................... 210/605, 610–612, 210/615–618, 631, 903

[56] References Cited

U.S. PATENT DOCUMENTS

| | | | |
|---|---|---|---|
| 3,617,539 | 11/1971 | Grutsch et al. .......................... | 210/631 |
| 4,076,515 | 2/1978 | Richard .................... | 210/631 |
| 4,537,682 | 8/1985 | Wong-Chong .......................... | 210/611 |
| 4,839,052 | 6/1989 | Maree ...................... | 210/611 |
| 5,240,600 | 8/1993 | Wang et al. ............................ | 210/615 |

FOREIGN PATENT DOCUMENTS 0537694  4/1993  European Pat. Off. .
4427065  3/1995  Germany .

OTHER PUBLICATIONS

Patents Abstracts of Japan, Publication No. JP55064899, Publication Date: May 15, 1980, 3 pages.
Patent Abstracts of Japan, Publication No. JP59076597, Publication Date: May 1, 1984, 3 pages.
Patents Abstracts of Japan, Publication No. JP59173199, Publication Date: Oct. 1, 1984, 3 pages.

*Primary Examiner*—Thomas G. Wyse
*Attorney, Agent, or Firm*—Webb Ziesenheim Bruening Logsdon Orkin & Hanson, P.C.

[57] ABSTRACT

The invention relates to a process for cleaning a waste water stream or the like, comprising:

a desulphurization step, in the form of addition of a desulphurizing agent, and addition of a buffer; followed by a biodenitrification step carried out by micro-organisms which feed on the buffer remaining in the waste-water stream of the desulphurization step;

wherein sulphur contamination and the like is removed in the desulphurization step and wherein nitrate contamination and the like as well an the buffer, are removed in the bio-denitrification step.

10 Claims, 1 Drawing Sheet

PROCESS FOR CLEANING A WASTE WATER STREAM OR THE LIKE

Waste gasses such as flue gas produced by power stations often, comprise sulphur compounds such as $SO_2$.

Removal of sulphur compounds is important to insure that $SO_2$, which is environmentally harmful, is not released into the atmosphere.

Desulphurization is often carried out by washing the flue gas with lime or with a limestone suspension, whereby the $SO_2$ is precipitated out in the form of hydrated calcium sulphate (gypsyum).

The reaction of for example limestone with $SO_2$ is as follows:

| | | |
|---|---|---|
| $SO_2 + H_2O$ | $\rightarrow$ | $H_2SO_3$ |
| $CaCO_3 + H_2SO_3$ | $\rightarrow$ | $HSO_3^- + HCO_3^- + Ca^{2+}$ |
| $2\,HSO_3^- + O_2$ | $\rightarrow$ | $2H^+ + 2SO_4^{2-}$ |
| $SO_4^- + Ca^{2+} + H_2O$ | $\rightarrow$ | $CaSO_4 2H_2O$ (gypsum) |
| $H^+ + HCO_3$ | $\rightarrow$ | $H_2O + CO_2$ |

It is well known that buffers accelerate the adsorption of $SO_2$ into the limestone suspension by preventing a large decrease in the pH value of the $SO_2$ containing droplets, so that more $SO_2$ can be removed.

A problem herewith however is that the buffers remain in the waste-water stream, this being environmentally undesirable.

Furthermore, during washing, a proportion of NOx present in the flue gasses dissolves in the scrubber liquor, whereby undesired nitrogen compounds, for example nitrates/nitrites, are formed.

A known method for removing such nitrogen compounds from contaminated streams of waste-water and the like, is by using micro-organisms.

An object of the present invention is to provide an improved process for cleaning waste-water streams and the like.

According to a first aspect of the present invention there is provided a process for cleaning a waste water stream or the like, comprising:

a desulphurization step, in the form of addition of a desulphurizing agent, and addition of a buffer; followed by a bio-denitrification step carried out by micro-organisms which feed on the buffer remaining in the stream after the desulphurization step;

wherein sulphur contamination and the like is removed in the desulphurization step and wherein nitrate contamination and the like as well as the buffer, are removed in the bio-denitrification step.

Sulphur is therefore removed from flue gas, for example, in the buffer enhanced desulphurization step, the flue gas which is then washed whereby nitrate contamination is removed along with the buffer from the waste-water stream.

Hence according to the present invention the advantage of improved desulphurization via addition of buffers is not offset by the continued presence thereof in the stream, since these buffers are in turn used as a food source (carbon) to drive the biological denitrification step wherein the micro-organisms carry out the reduction of NOx to $N_2$, wherein the main reaction is as follows:

$$26NO_3^- + 5HOOC(CH_2)_4COOH \rightarrow 13N_2 + 30\,CO_2 + 12H_2O + 26OH^-$$
adipic acid The desulphurizing agent is preferably lime or a limestone suspension which efficiently removes $SO_2$ whereby, as a result, gypsum is formed.

The buffers can be organic acids preferably selected from a group consisting of formic acid, acetic acid, adipic acid, a mixture of dibasic acids formed as a rest product during adipic acid production and the dibasic acids, glutaric acid and succinic acid, wherein the reaction of adipic acid, for example, with $SO_2$ is as follows:

$$SO_2 + H_2O \rightarrow H_2SO_3$$

$$HOOC(CH_2)_4COO^- + H_2SO_3 \rightarrow HOOC(CH_2)_4COOH + HSO_3^-$$

Inorganic acid buffers can also be used such as $MgHCO_3$, the reaction of which proceeds as follows:

$$MgHCO^+_3 + H_2SO_3 \rightarrow Mg^{2+} + H_2O + CO_2 + HSO_3^-$$

Further preferred process conditions are detailed in the claims 4–10.

According to further aspects of the invention there is provided the use of a buffer to enhance the desulphurization of a waste-water stream or the like with a desulphurizing agent such as line or a limestone suspension, the use of micro-organisms for removing butter from a waste water stream or the like, and a system of apparatus for cleaning a waste-water stress or the like.

Figure 2:
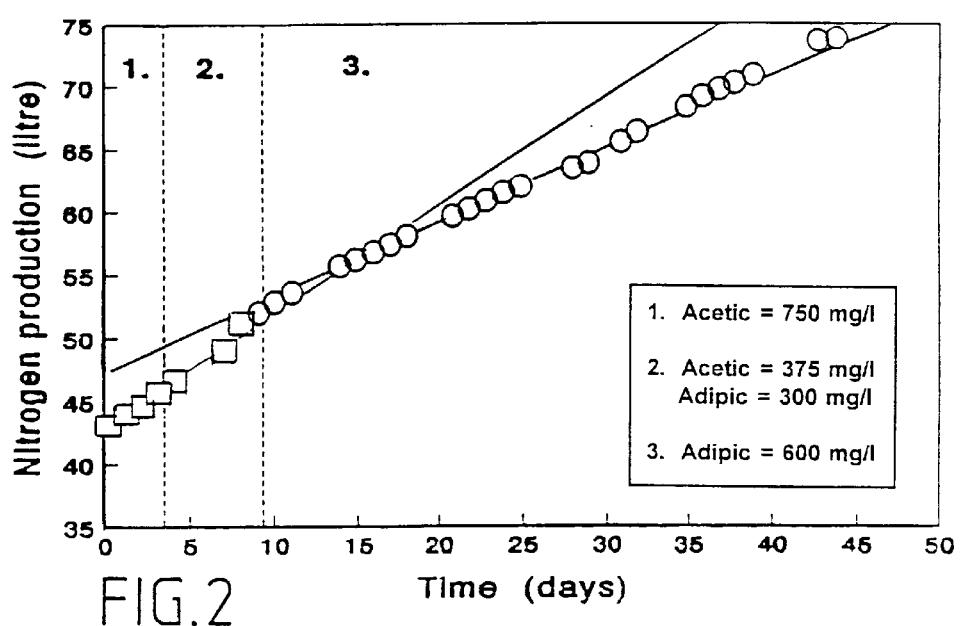

The invention will now be described by way of an experimental example, with reference to:

FIG. 1, showing schematically a system for the biological denitrification of waste water, and FIG. 2, showing a graph illustrating the influence of buffer concentration in the biological denitrification rate, and the accompanying tables.

Experiments were carried out in the system as shown in the figure.

A stirred tank reactor 1 containing a bio-mass of micro-organisms at a concentration of between 1–5 mg volatile suspended solids/l was fed by a stream C consisting of a waste-water stream A from a desulphurization installation of an electricity generating station, to which a nutrient stream B, which served as additional bio-mass energy source was dosed. The temperature in the reactor was measured with a thermocouple as being 36° C. The pH was also measured and remained at 7.0 during the measurements.

A working lower pH range of between 5.9 and 6.5 is preferred in order to keep precipitation of carbonates to a minimum.

Analysis of the main components of stream C was carried out, the results being summarized in table 1.

TABLE 1

| | |
|---|---|
| chloride (g/l) | 30 |
| sodium (g/l) | 9[1] |
| calcium (g/l) | 5[1] |
| magnesium (g/l) | 2,5[1] |
| sulphate (g/l) | 2[1] |
| nitrate (mg/l) | 300 |
| nitrate (mg/l) (after dosage) | 1000 |
| ammonia (mg/l) (after dosage) | <0,1 |
| phosphate (after dosage) (mg/l) | 9 |
| pH | 6,5–7,0 |

[1]Estimated values

The reactor 1 had a double wall wherein warm water was circulated to ensure constant temperature for the microorganisms. The volume of the reactor was 2.7 liters and the biomass was held in suspension by means of a stirrer 2 to provide a good contact between the micro-organisms and the stream.

The flow of stream C was 180 milliliters per hour whereby the resident time in the reactor 1 was 15 hours, whereafter nitrogen gas, stream D, was separated from the overflow stream E and, after removal of carbon dioxide with soda chalk, measured with a wet gas meter.

The resulting stream F was fed into a sedimentation tan 3, to separate the bio-mass from the effluent which is returned to the reactor, stream H.

An effluent stream, I, was guided away from the tank 3 for analysis.

The experiment was started by dosing stream B wit a supply of acetic acid at a concentration of 750 mg/l.

After four days, the amount of acetic acid was halved and replaced by 300 mg/l adipic acid.

After eight days the acetic acid was completely replaced by adipic acid with a concentration of 600 mg/l.

The nitrogen production was measured daily and is reproduced in the graph, FIG. 2. Furthermore, samples were taken on various days of the stream C and the effluent, wherein the total nitrite plus nitrate concentration was determined, see table 2.

TABLE 2

| day number | concentration (mg)$NO_3 + NO_2 - N/l$ stream C | stream I | carbon source |
| --- | --- | --- | --- |
| 0 | 75.7 | 2.7 | carbon source |
| 3 | 230 | 0.9 | is 750 mg/l acetic acid |
| 8 | 180 | 41.6 | carbon source |
| 14 | 233 | 52.7 | is 600 mg/l |
| 18 | 345 | 65.4 | adipic acid |
| 28 | 292 | 49.1 | |
| 44 | 214 | 52.2 | |

From the nitrogen production, and the difference in nitrite and nitrate concentration between stream C and the effluent stream, I, it is clearly apparent that biological denitrification is successful with the help of acetic acid and adipic acid. Although the results showed that nitrogen production, and therefore the denitrification rate, is less with adipic acid than with acetic acid, adipic acid is currently preferred as a buffer in the desulphurization process since this does not evaporate as readily as acetic acid and formic acid, whereby it is less environmentally harmful and more economically favorite. Furthermore adipic acid is odourless, this not being the case with acetic acid which has an unpleasant smell. It should be noted that formic acid may be economically favorable if evaporation is not taking into consideration.

The denitrification rates for both acetic and adipic acid were calculated from the concentration difference between stream C and the effluent stream, I, using the average concentrations as shown in table 3, for acetic acid, and table 4, for adipic acid, and the direction coefficients of the lines from the graph, and are given below in the tables 3 and 4 respectively.

TABLE 3

| acetic acid | $NO_x$—N | $NH_4$—N | $PO_6$—P |
| --- | --- | --- | --- |
| stream C | 230 | <0.1 | 2.6 |
| stream I | 1.4 | 8.5 | 0.4 | denitrificatian rate:
based on $NO_3$-removal: 15.2 mg($NO_x$—N)/liter(reactor)/h
based on $N_2$-production: 15.5 mg($NO_x$—N)/liter(reactor)h

TABLE 4

| adipic acid | $NO_x$—N | $NH_4$—N | $PO_4$—P |
| --- | --- | --- | --- |
| stream C | 253 | <0.1 | 3.1 |
| stream I | 52.2 | <0.2 | 1.3 | denitrification rate:
based on $NO_3$-removal: 13.4 mg($NO_x$—N)/liter(reactor)/h
based on $N_2$-production: 10.8 mg($NO_x$—N)/liter(reactor)/h The composition of waste-water originating from coal fired power stations varies considerably, although it is nearly always saturated with gypsum. Table 5 shows, for comparison, the ranges of a number of main components, and the pH, of wastewater after having been treated in waste-water treatment installations currently in use in the Netherlands.

TABLE 5

| | min | max | average |
| --- | --- | --- | --- |
| waste water flow ($m^3$/h) | 0 | 30 | 11 |
| chloride (g/l) | 5 | 50 | 30 |
| sodium (g/l) | 0.5 | 20 | 9[1] |
| calcium (g/l) | 1 | 15 | 5[1] |
| magnesium (g/l) | 0.1 | 5 | 2.5[1] |
| sulphate (g/l) | 0.5 | 3 | 2[1] |
| nitrate (mg/l) | 100 | 1000 | 300 |
| pH (after treatment) | | | 8.6–9.5 |

[1]Estimated values

Biological denitriftication is more difficult, the higher the concentration of these components. Since chloride always has the highest concentration of all the other components in waste water, the concentration hereof is an important parameter. It has been shown by the present invention that biological denitrification can still effectively be carried out at a chloride concentration of 44 grams per liter which does not therefore rule cut that it could also be effectively carried out at still higher concentrations. Besides the main components shown in table 5, waste water also comprises a large number of elements at lower concentrations, i.e. B, F, Fe, Al, Ba etc. and trace elements, i.e. As, Cd, Cr, Cu, Co, Se, Hg, Ni, Pb, V, Zn etc).

In order to ensure good biological denitrification, the concentrations of heavy metals should not be too high or else poisoning of the micro-organisms could ensue. Biological denitrification can therefore best be carried out on waste streams from which heavy metals have already been removed.

The present invention is not limited by the description, examples and results obtained above, but is rather determined by the scope of the following claims.

We claim:

1. Process for cleaning a waste water stream or the like, comprising:
   a desulphurization step, in the form of addition of a desulphurizing agent, and addition of a buffer; followed by
   a biodenitrification step carried out by micro-organisms which feed on the buffer remaining in the waste-water stream of the desulphurization step;
   wherein sulphur contamination and the like is removed in the desulphurization step and wherein nitrate contamination and the like as well as the buffer, are removed in the bio-denitrification step.

2. Process according to claim 1 wherein the desulphurization agent comprises lime or a limestone suspension whereby $SO_2$ is removed in the form of precipitated hydrated calcium sulphate.

3. Process according to claim 1 wherein the buffer is an organic acid.

4. Process according to claim 3 wherein the buffer is selected from the group consisting of formic acid, acetic acid, adipic acid, a mixture of dibasic acids formed as a rest product during adipic acid productions, glutaric and succinic acid.

5. Process according to claim 1 wherein between 100–3000 mg/l buffer is added to the waste stream.

6. Process according to claim 1, wherein the microorganisms are bacteria selected from the group consisting of Achromobacteria, Aerobacteri Alcaligenes, Bacillus, Brevibacteria, Flavobacteria, Lactobacteries Micrococcus, Proteus, Pseudomonas and Spirillia.

7. Process according to claim 6 wherein the microorganisms are present in a biomass concentration at a maximum of 10 grams violatable suspended solids per liter in a biomass reservoir.

8. Process according to claim 7 wherein biodenatrification is carried out at a pH of between 5.5 and 10, preferably 6.5.

9. Process according to claim 8, carried out at a temperature of between 15 and 50 degrees centigrade, preferably between 35 and 40 degrees centigrade.

10. Process according to claim 9 wherein the microorganisms are brought into contact with the stream via a carrier.

* * * * *

UNITED STATES PATENT AND TRADEMARK OFFICE
CERTIFICATE OF CORRECTION

PATENT NO. : 5,830,357
DATED : November 3, 1998
INVENTOR(S) : Leonardus H. J. Vredenbregt et al.

It is certified that error appears in the above-identified patent and that said Letters Patent is hereby corrected as shown below:

Column 1 Line 12 "gypsyum" should read --gypsum--.

Column 2 Line 22 "line" should read --lime--.

Column 2 Line 23 "butter" should read --buffer--.

Column 2 Line 25 "stress" should read --stream--.

Column 3 Line 6 "tan 3" should read --tank 3--.

Column 3 Line 12 "wit" should read --with--.

Column 3 Line 46 "favorite." should read --favorable.--.

Claim 6 Column 5 Line 14 "Aerobacteri" should read --Aerobacteria--.

Claim 6 Column 5 Line 15 "Lactobacteries" should read --Lactobacteria--.

Claim 7 Column 6 Line 3 "violatable" should read --volatile--.

Signed and Sealed this

Twenty-fifth Day of May, 1999

Attest:

Q. TODD DICKINSON

Attesting Officer

Acting Commissioner of Patents and Trademarks